United States Patent [19]

Wang et al.

[11] 4,293,332

[45] Oct. 6, 1981

[54] HYDROMETALLURGICAL PROCESS FOR RECOVERING PRECIOUS METALS FROM ANODE SLIME

[75] Inventors: Wei Ko Wang, Lung-Tan; Ying-Chu Hoh, Chia-An Village; Wen-Shou Chuang; I-Sine Shaw, both of Taipei, all of Taiwan

[73] Assignee: Institute of Nuclear Energy Research, Taiwan

[21] Appl. No.: 132,493

[22] Filed: Mar. 20, 1980

Related U.S. Application Data

[63] Continuation-in-part of Ser. No. 46,685, Jun. 8, 1977, abandoned.

[51] Int. Cl.$^3$ ............................................. C22B 11/04
[52] U.S. Cl. .................................. 75/99; 75/101 BE; 75/118 R; 75/118 P; 75/121; 423/24; 423/27; 423/510
[58] Field of Search .................. 75/99, 118 R, 118 P, 75/101 BE, 121; 423/24, 27, 510

[56] References Cited

U.S. PATENT DOCUMENTS

| | | | |
|---|---|---|---|
| 1,315,660 | 9/1919 | Ferguson | 75/99 |
| 2,076,738 | 4/1937 | Martin et al. | 423/510 |
| 2,084,394 | 6/1937 | Heberlein | 75/99 |
| 3,127,244 | 3/1964 | Elkin et al. | 75/99 X |
| 3,387,928 | 6/1968 | Doumas | 423/510 X |
| 3,414,380 | 12/1968 | Mod | 423/510 |
| 3,419,355 | 12/1968 | Van Stein | 75/99 X |
| 3,658,510 | 4/1972 | Hoffmann et al. | 75/99 |
| 3,944,414 | 3/1976 | Yanagida et al. | 75/99 |
| 3,996,046 | 12/1976 | Hoffmann et al. | 75/99 |
| 4,002,544 | 1/1977 | Heimala et al. | 75/118 R X |
| 4,076,605 | 2/1978 | Bilson | 75/99 X |
| 4,094,668 | 6/1978 | Yannopoulos et al. | 75/99 |
| 4,163,046 | 7/1979 | Subramanian et al. | 75/99 X |

Primary Examiner—G. Ozaki
Attorney, Agent, or Firm—Burns, Doane, Swecker & Mathis

[57] ABSTRACT

A hydrometallurgical process for recovering precious metals, such as gold, silver, selenium, and tellurium etc. from anode slime has been developed and tested successfully. The process comprises three major unit operations: leaching, liquid-liquid extraction, and reduction. The decopperized anode slime is first leached with nitric acid at an elevated temperature to obtain a leach solution containing at least about 95% by weight of the silver content, 96% by weight of the selenium content and 76% by weight of the tellurium content of the decopperized anode slime. Silver in the nitric acid leach solution is recovered in the form of silver chloride. Subsequent to the recovery of silver chloride, the selenium, tellurium, copper and other impurities-containing solution is denitrated and chlorinated by a liquid-liquid extraction technique. This selenium, tellurium, copper and other impurities-containing chloride solution is treated to separate tellurium from selenium, copper and other impurities by a liquid-liquid extraction technique. Selenium and tellurium are then recovered individually by passing sulfur dioxide through the selenium-containing and tellurium-containing solutions. The nitric acid leach residue is treated with aqua regia to leach gold and other impurities at an elevated temperature for a period of about 1 to 4 hours. The gold-containing solution is sent to separate gold from other impurities by a liquid-liquid extraction technique. Gold with a purity of greater than 99.9% is recovered by introducing a reducing agent to the gold-loaded organic extractant at an elevated temperature for a period of about 2 to 4 hours. This newly developed process is pollution-free, energy-saving, and economic to compare with conventional pyrometallurgical processes.

17 Claims, 4 Drawing Figures

HYDROMETALLURGICAL PROCESS FOR RECOVERING PRECIOUS METALS FROM ANODE SLIME

REFERENCE TO RELATED APPLICATIONS

This application is a continuation-in-part application of U.S. patent application Ser. No. 46,685, filed June 8, 1977 and now abandoned.

BACKGROUND OF THE INVENTION

This invention relates to a new process to recover the precious metals, such as gold, silver, selenium and tellurium, etc. from copper refinery anode slimes.

Copper refinery anode slimes, briefly called anode slimes, which are settled and accumulated at the bottom of electrolytic copper refining cells, are made up of those components of the anodes which are not soluble in the electrolyte. They containing varying quantities of copper, silver, gold, sulphur, selenium, tellurium, lead, arsenic, antimony, nickel, silica, iron, etc. The object of treating anode slimes has always been the recovery and separation of precious metals. With the passage of time, increasing attention has been paid to improving the recovery and quantity of by products, mainly selenium and tellurium.

The conventional treatment of anode slimes entails numerous, and often complex, hydro- and pyrometallurgical operations. These result in the removal of the various constituents over a number of process steps, the nature of the particular anode slimes being treated determining the final procedure adopted.

In general existing anode slimes treatment processes have been designed to remove copper first, and then to recover the precious metals in the form of an alloy, referred to as Dore metal. Impurities such as selenium constitute useful by-products. Whilst recoveries of silver, gold and copper are high at about 97 percent, the recovery of selenium seldom exceeds 80 percent. Also, because of the tendency for selenium to oxidise and volatilise at fairly low temperatures, it is evolved during all heat-treatment stages and its collection is thus spread over the entire process.

Copper present in the slimes occurs usually as metallic copper dislodged from the anodes, together with copper sulphides, selenides and tellurides. Depending on how effectively the slimes have been washed after being removed from the electrolytic cell, they may contain up to 25 percent of the copper as water-soluble sulphates. The usual practice is to remove the copper as the first stage in the slimes treatment process. This is accomplished by carrying out a low temperature (260° to 430° C.) oxidizing roast followed by sulphuric acid leaching. Alternatively, the slimes may be digested at about 260° C. for 8 to 12 hours with concentrated sulphuric acid to decompose the selenides and the reaction completed by roasting the mass. The soluble copper sulphate is then separated from the calcine by leaching with water. The copper sulphate solutions obtained by these methods are usually contaminated with selenium and silver, which must be removed before the copper is finally recovered by electrowinning, cementation or crystallisation as copper sulphate.

Selenium occurs in the slimes both as metallic selenides and as the element. It is generally recovered by smelting the decopperized slimes with soda or nitre and dissolving the resulting water-soluble sodium selenite from the crushed slag. Elemental selenium is then precipitated by passing sulphur dioxide gas through the acidified leach solution.

Other important methods include roasting with concentrated sulphuric acid, when the selenides are converted to selenium dioxide which volatilises and is collected in wet scrubbers and elecrostatic precipitators. Selenium is precipitated from the scrubber solutions as described above, purified by dissolution and re-precipitation and finally distilled to obtain a readily marketable product.

The decopperized anode slimes, containing varying amounts of selenium, are smelted in a Dore furnace, the major impurities such as lead, arsenic, selenium and copper being slagged off with silica, soda and nitre. The resulting Dore metal, containing the gold, silver and platinoids, is then electrolytically refined in a Moebius. Silver of "three nines" quality or better is recovered at the cathodes, while the gold and platinoids, together with some silver, settle as an anode sludge. The sludge may be treated by boiling with sulphuric acid to dissolve the silver and high purity gold may then be recovered from the residue by smelting and electrorefining.

The above mentioned conventional pyrometallurgical process to recover the precious metals is getting harder and harder to operate due to the facts that energy costs have soared, the strict pollution laws have been enacted and high grade ores have been depleted.

After an intensive investigation into the problems and limitations of conventional pyrometallurgical process for the treatment of copper refinery anode slimes, we have now designed a new process for these anode slimes that provides a clean separation of the valuable constituents of the slimes without producing a large amount of off-gas as well as wasting a large amount of energy.

In order to cope with the soaring energy costs, to comply with strict pollution laws and to face up to the depletion of high grade ore, a new hydrometallurgical process to recover the precious metals has been developed and tested successfully. The process is economic, energy-saving as well as pollution-free. The newly developed hydrometallurgical process consists of (1) leaching step, where the precious metals are introduced to the aqueous environment, (2) solvent extraction step, where the metals are separated and purified, and (3) reduction step, where the metallic ions are reduced and precipitated from solutions.

SUMMARY OF THE INVENTION

Our new process for the recovery of the gold, silver, selenium and tellurium content of decopperized anode slimes comprises treating the slimes three times with stoichiometric proporations of nitric acid at a concentration of about 4 to 9 M and at a temperature of between about 40° to 115° C. for a period of at least 40 minutes to obtain a nitric acid leach solution containing at least about 95% by weight of the silver content, about 96% by weight of the selenium content and about 75% by weight of tellurium content of the decopperized anode slimes and to obtain a nitric acid leach residue containing gold, antimony, arsenic, tin, silica, lead platinoids and other impurities content of the decopperized anode slimes. The nitric acid leach solution, i.e., the silver, selenium, tellurium and copper-containing solution, is separated from the nitric acid leach residue and is treated to recover the silver content in the form of silver chloride by adding stoichiometric proporations of hydrochloric acid. The selenium, tellurium and copper-containing solution is separated from silver chloride and is treated to recover the selenium and tellurium content thereof. Since the separation of tellurium from selenium, copper and other impurities as well as the precipitation of selenium and tellurium by sulfur dioxide are all in chloride media, hence, the selenium, tellurium and copper-containing solution should be converted from nitrate to chloride form before the recovery of selenium and tellurium. Denitration and chlorination of the selenium, tellurium and copper-containing solution is accomplished by a liquid-liquid extraction technique, 5% to 100% by volume of the neutral or basic organic solvent, such as tri-n-butyl phosphate, balanced with a hydrocarbon diluent, such as kerosene, is used as the organic extractant and 8 M or higher of hydrochloric acid is introduced into an extraction stage prior to the stage in which the lead selenides are precipitated. At least six extraction stages are required to denitrate the selenium, tellurium and copper-containing solution from free acid content of 5 M or higher to 0.1 M or less and to chlorinate the denitrated solution to the free acid content of 2.0 M or higher. The nitrate ion-loaded organic extractant is stripped with water to recover nitric acid and the stripped organic extractant is recycled back to the denitration and chlorination step. The stripping step consists of at least six stages or more. After denitration and chlorination, the acidity of the selenium, tellurium and copper-containing chloride solution is concentrated from 2 to 4 M or higher. The resulting selenium, tellurium and copper-containing solution after concentration is treated to separate tellurium from selenium, copper and other impurities by a liquid-liquid extraction technique, 5% to 100% by volume of the neutral or basic organic solvent, such as tri-n-butyl phosphate, balanced with a hydrocarbon diluent, such as kerosene (e.g., 75% by volume of tri-n-butyl phosphate and 25% by volume of kerosene), is used as the organic extractant, 4 M or higher of hydrochloric acid (e.g., 4 M) is used as the scrubbing agent, and 1 M or less of hydrochloric acid is used as the stripping agent. The extraction step consists of two stages or more, the scrubbing step is conducted in two stages or more and the stripping step consists of two stages or more. Tellurium is extracted into the organic extractant, i.e. tellurium-loaded organic extractant, and selenium, copper and other impurities remain in the aqueous phase, i.e., selenium-containing solution. Selenium is precipitated and recovered from the selenium-containing solution with sulfur dioxide at a temperature range from 35.1° to 45° C. and at a free acid content from 3.5 to 5.4 M. Tellurium is stripped from the tellurium-loaded organic extractant to the aqueous phase with 1 M or less of hydrochloric acid solution. The stripped organic extractant is recycled back to the extraction step and the tellurium-containing aqueous solution is treated to recover tellurium. Precipitating tellurium from the tellurium-containing aqueous solution is accomplished by passing sulfur dioxide through the aqueous solution at a temperature range from 10° to 45° C. and free acid content greater than 0.1 M of hydrochloric acid.

Leaching of the nitric acid leach residue with stoichiometric proportions of aqua regia at an elevated temperature of between about 40° to 110° C. for a period of at least 1 hour. The ratio of HCl to $HNO_3$ in aqua regia solution is about from one to one to ten to one in parts. In the aqua regia leaching step, gold, arsenic, antimony, lead, tin, silica, platinoids and a small amount of silver are leached to the aqua regia leach solution, i.e., the gold-containing solution which contains at least 99.46% by weight of the gold content of the nitric acid leach residue. The gold-containing solution is separated from the aqua regia leach residue and is treated to recover the gold content thereof. A liquid-liquid extraction technique is used to separate gold from arsenic, antimony, tin, silica, platinoids and other impurities at a temperature of 30° C. or less (e.g., between about 15° to 20° C.). Ether having a carbon content of 10 to 12, such as diethylene glycol dibutyl ether, is used as the organic extractant and 2 M or higher of hydrochloric acid solution is used as the scrubbing solution. The extraction step consists of one stage or more and the scrubbing step is conducted in at least two stages. Gold is extracted into the organic extractant and this gold-loaded organic extractant is used to precipitate and recover the gold content by introducing a stoichiometric proportions of oxalic acid at an elevated temperature of between about 40° to 100° C. for a period of at least 3 hours. Finally, the gold is separated from the solution and washed with methanol and then with distilled water to recover the pure sponge gold with a purity of 99.9%. The organic extractant is recycled back to the gold extraction step for reusing. FIG. 1 is shown system diagram of the present invention.

The procedures outline above have the following advantages over the pyrometallurgical art.

(1) The highest operating temperature in the inventive and pyrometallurgical processes are 80° C. and 1300° C. respectively. Therefore, the energy consumption for the inventive process is much lower than for the pyrometallurgical art, (2) The treatment of the wastes from the inventive process are much easier than from the pyrometallurgical art, (3) The recovery rate of selenium for the inventive process is greater than 94 percent whereas for the pyrometallurgical art, it seldom exceeds 80 percent, (4) In the process of the invention, gold and silver can be recovered directly without going through a gold-silver alloy stage, (5) The liquid-liquid extraction technique is suitable for recovering metals from low content mother liquor. This technique is easy to operate and is also suitable for continuous operation, and (6) In this invention, all of the organic and most of the mineral acids are recycled and reused along with the low energy consumptions, making the process more economic and more attractive.

For better understanding of the present invention, together with other objectives, advantages and capabilities thereof, reference is made to the following detailed description in conjunction with the drawings.

DETAILED DESCRIPTIONS OF THE INVENTION

To more fully illustrate the process of the invention, the following example is presented. It is to be understood, however, that the example is given by way of illustration and not limitation and that many changes many be effected without departure from the scope and spirit of the appended claims.

EXAMPLE

Decopperized anode slime leaching experiment is carried out in a flask equipped with an agitator, a condenser, heating apparatus and a set of temperature indicator and controller. 1500 Grams (dry basis) of decopperized anode slime containing 283.38 grams of silver, 222.3 grams of selenium, and 13.95 grams of tellurium together with stoichiometric proportions of nitric acid are placed in the said flask heated for 2 hours at a temperature of 80° C. The resulting pulp is filtered and the nitric acid leach residue is sent to the aqua regia leaching step for recovering of gold. The filtrate, the Ag, Se, Te, Pb, Cu and other impurities-containing solution, is found to contain 272.4 grams of silver, 215.6 grams of selenium and 10.6 grams of tellurium together with other impurities equaling 96.1%, 97%, and 76% leaching rate for silver, selenium, and tellurium respectively. In the Ag, Se, Te, Pb, Cu and other impurities-containing solution, stoichiometric proportions of hydrochloric acid are added and the resulting precipitated silver chloride is filtered, washed and dried to give a purity of 99.2% of silver chloride. The other impurities such as lead and tellurium in silver chloride are less than 0.017 percent and 0.001 percent respectively.

Figure 1:
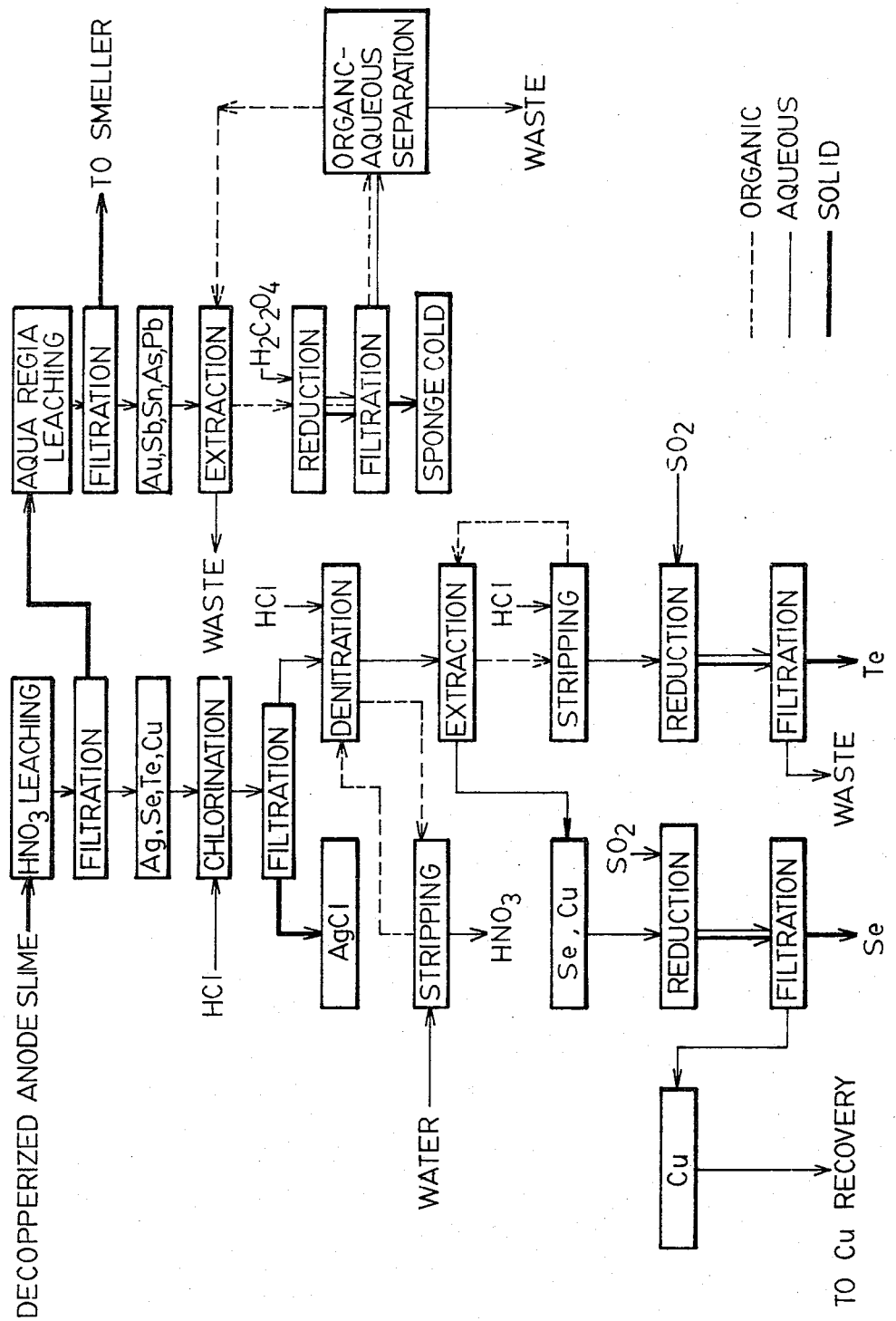
FIG. 1 is a system diagram indicating treatment of decopperized anode slime by the present invention.
Figure 2:
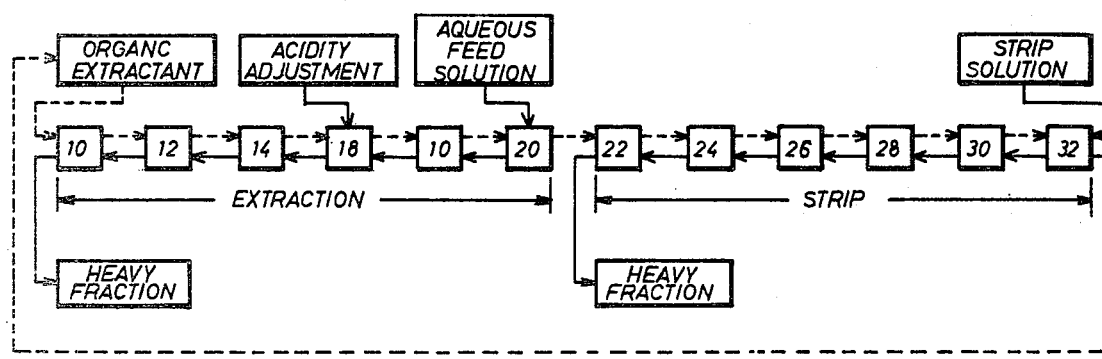
FIG. 2 is a system diagram indicating the present invention wherein denitration and chlorination are carried out subsequent to the silver recovery step.

Subsequent to the recovery of silver chloride, the filtrate, the Se, Te, Pb, Cu and impurities-containing solution, is sent to the denitration and chlorination step by using a liquid-liquid extraction technique. With particular reference to FIG. 2, the denitration and chlorination step, or extraction step, consists of six stages, 10, 12, 14, 16, 18 and 20. Also conducted in six stages, 22, 24, 26, 28, 30 and 32 is the nitric acid recovery step or stripping step. The Se, Te, Pb, Cu and impurities-containing solution with nitrate ion level of 5.7 M is fed to extraction stage 20 at a rate of 4.0 parts per minute and 8 M hydrochloric acid is fed to extraction stage 16 at a rate of 1.67 parts per minute. An organic extractant is prepared containing about 25 parts by volume of kerosene and 75 parts by volume of tri-n-butyl phosphate. This organic extractant is fed to extraction stage 10 at a rate of 12.7 parts per minute. The system, as described above, is operated for about 16 hours at the aforementioned flow rates. Samples are collected for every 10 minutes in the first hour, 20 minutes in the second hour and 30 minutes in the rest of the operating period. The aqueous raffinate, the Se, Te, Pb, Cu and impurities-containing chloride solution, exit from extraction stage 10 at nitrate and chloride ion levels of 0.1 M and 2.15 M respectively. This Se, Te, Pb, Cu and impurities-containing chloride solution is concentrated to the free acid content of 4.7 M by vacuum evaporation and sent to the selenium and tellurium separation step. The nitrate ion loaded organic extractant exiting from extraction stage 20 at a rate of 12.7 parts per minute is fed to stripping stage 22 for recovering nitric acid. Water is used as the stripping agent and is fed to stripping stage 32 at a rate of 8.5 parts per minute. The recovered nitric acid with a nitrate ion level of 2.5 M exits from stripping stage 22 and is recycled to the decopperized anode slime leaching step. The stripped organic extractant is recycled to extraction stage 10 for reusing.

Figure 3:
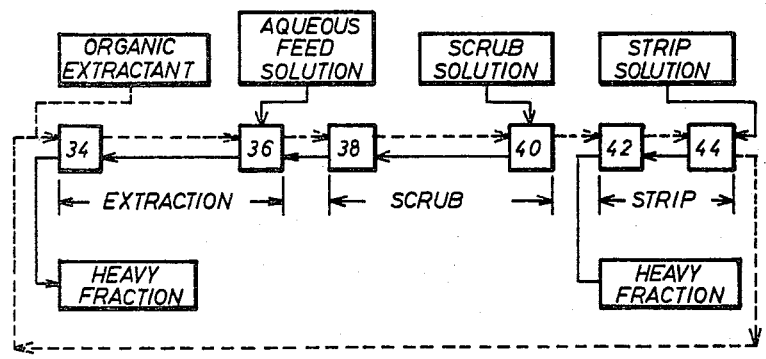
FIG. 3 is a system diagram indicating the present invention wherein the separation of tellurium from selenium, copper, etc. is carried out subsequent to the denitration and chlorination step.

After denitration, chlorination, and concentration, the Se, Te, Pb, Cu and impurities-containing solution at a chloride ion level of 4.7 M is treated to separate tellurium from selenium, lead, copper and other impurities by a liquid-liquid extraction technique. With reference to FIG. 3, the extraction step consists of two stages, 34 and 36, the scrubbing step includes two stages, 38 and 40 and the stripping step is conducted in two stages, 42 and 44. The Se, Te, Pb, Cu and impurities-containing chloride solution is fed to extraction stage 36 at a rate of 3 parts per minute. An organic extractant containing 30 parts by volume of tri-n-butyl phosphate and 70 parts by volume of kerosene is prepared and fed to extraction stage 34 at a rate of 4.5 parts per minute. 5 M hydrochloric acid is fed to scrubbing stage 40 at a rate of 0.9 part per minute as the scrubbing agent and 0.5 M hydrochloric acid is fed to stripping stage 44 at a rate of 0.9 part per minute as the stripping agent. 69 Grams per liter of Se and impurities such as Pb, Cu etc. containing chloride solution with the free acid content of 4.5 M together with the scrub solution exit from extraction stage 34. Sulphur dioxide is then passed through the Se, Pb, Cu and impurities-containing solution to reduce selenium at a temperature of about 38° C. Red brick selenium is precipitated out. After filtration, washing and drying, 210 grams of gray dark selenium with purity greater than 99.5 percent are obtained. This is equal to 94.4 percent recovery rate for selenium. 14.1 Grams per liter of tellurium-containing solution with 1.67 M in chloride ion level exit from the stripping stage 42. Sulphur dioxide is passed through this Te-containing solution to reduce tellurium at a temperature of 30° C. After filtration, washing and drying, 9.9 grams of high purity gray dark tellurium are obtained. This indicates 71 percent recovery rate for tellurium. The stripped organic extractant exit from stripping stage 44 and is recycled to extraction stage 34 for reusing.

Figure 4:
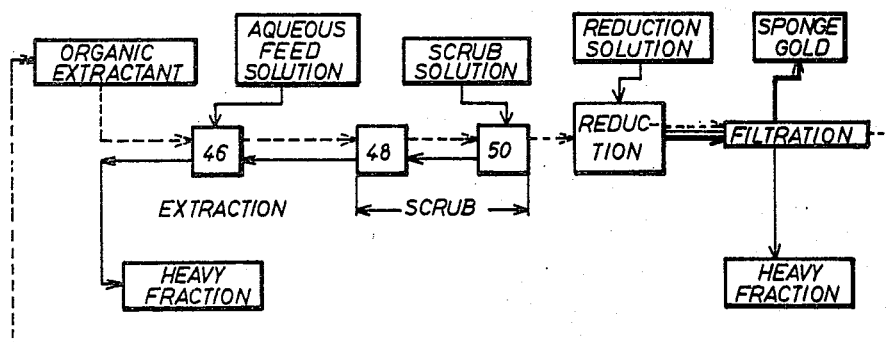
FIG. 4 is a system diagram indicating the present invention wherein the separation of gold from arsenic, antimony, tin, silica, platinoids and other impurities is carried out.

Aqua regia leaching is conducted in the same apparatus as described in the decopperized anode slime leaching step. 1500 Grams (dry basis) of the nitric acid leach residue containing 37.395 grams of gold together with stoichiometric proportions of aqua regia are charged into the leaching apparatus. The aqua regia solution is prepared with one part of nitric acid and ten parts of hydrochloric acid. This system is maintained at 80° C. for four hours. Almost all of gold together with some other impurities, such as tin, antimony, arsenic silica, platinoids and other impurities can be leached. The pulp is then filtered and the aqua regia leach residue which contains 0.0162% gold, 1.51% of silver and 26% of lead is recycled back to the copper smelter. A liquid-liquid extraction technique is used to separate gold from other impurities. With reference to FIG. 4, the filtrated solution with gold concentration of 6.566 g/l, i.e., gold-containing solution, is fed to extraction stage 46 at a rate of 2.92 parts per minute. The organic extractant, diethylene glycol dibutyl ether, is fed to extraction stage 46 at a rate of 0.97 part per minute. 3 M of hydrochloric acid solution is used as the scrubbing agent and is fed to scrubbing stage 50 at a rate of 0.97 part per minute. The extraction raffinate together with the scrubbing solution containing 2 ppm of gold exit from extraction stage 46 at a rate of 3.89 parts per minute. The gold-loaded organic extractant exits from extraction stage 46 and enters scrubbing stage 48 and finally exits from scrubbing stage 50 at a rate of 0.97 part per minute. This gold-loaded organic extractant is charged into a flask containing stoichiometric proportions of oxalic acid solution and is kept at 70° C. to 80° C. for four hours with occasional stirring to ensure complete reduction of gold from the gold-loaded organic extractant. Filter off the metal and wash it successively with hydrochloric acid, water and methanol. Finally ignite the gold to constant weight. 99.46 Percent primary recovery rate can be obtained by using this process.

While there has been shown and described what are at present considered the preferred embodiments of the invention, it will be obvious to those skilled in the art that various changes and modifications may be made therein without departing from the scope of the invention as defined by the appended claims.

We claim:

1. A process for the recovery of gold, silver, selenium and tellurium from a copper refinery anode slime containing these metals which comprises:

treating a decopperized anode slime three times with stoichiometric proportions of about 4 to 9 M nitric acid and at a temperature between about 40° to about 115° C. for a period of at least 40 minutes to obtain a nitric acid leach solution containing at least about 95% by weight of the silver content, about 96% by weight of the selenium content and about 75% by weight of the tellurium content of the decopperized anode slime and to also obtain a nitric acid leach residue containing gold, arsenic, antimony, lead, silica, tin and other impurities present in the decopperized anode slime, denitrating and chlorinating the selenium, tellurium, lead, copper and other impurities-containing solution by liquid-liquid extraction with 5% to 100% by volume of neutral or basic organic solvent balanced with a hydrocarbon diluent as the organic extractant, 8 M or higher hydrochloric acid as the acidity adjustment solution and water as the stripping solution, separating tellurium from selenium, lead, copper and other impurities by liquid-liquid extraction using 5% to 100% by volume of a neutral or basic organic solvent balanced with a hydrocarbon diluent as the organic extractant, 4 M or higher hydrochloric acid as the scrubbing solution and 1 M or less hydrochloric acid as the stripping solution, precipitating selenium from the selenium-containing solution with sulfur dioxide at a temperature between about 35.1° to 45° C. and at a free acid content in the selenium-containing solution between about 3.5 to 5.4 M of the hydrochloric acid;

precipitating tellurium from the tellurium-containing solution with sulfur dioxide at a temperature between about 10° to 45° C. and a free acid content in the tellurium-containing solution greater than 0.1 M of the hydrochloric acid;

treating the nitric acid leach residue with stoichiometric proportions of aqua regia at an elevated temperature of between about 40° C. to 110° C. for a period of at least 1 hour to obtain an aqua regia leach residue containing at least 99.46% by weight of the gold content of the nitric acid leach residue, separating gold from arsenic, antimony, lead, tin, silica, platinoids and other impurities by liquid-liquid extraction at a temperature lower than 30° C. with ether having a carbon content of 10 to 12 as the organic extractant and 2 M or higher hydrochloric acid as the scrubbing solution, and recovering gold from the gold-loaded organic extractant with stoichiometric proportions of oxalic acid at an elevated temperature of between 40° to 100° C. for a period of at least 3 hours.

2. A process according to claim 1 wherein said nitric acid leaching temperature is 80° C. and about 7 to 8 M nitric acid is employed.

3. A process according to claim 2 wherein said 8 M or higher of the hydrochloric acid solution is introduced to an extraction stage prior to the stage in which the precipitation occurs.

4. A process according to claim 1 wherein said denitration and chlorination is carried out in at least six extraction stages and six stripping stages in order to denitrate the nitric acid leach solution from a free acid content in excess of 5 M to less than 0.1 M and to chlorinate the denitrated solution to increase the free acid content to 2 M or higher.

5. A process according to claim 1 wherein said organic extractant used in such denitration and chlorination comprises from 5% to 100% by volume of tri-n-butyl phosphate balanced with kerosene.

6. A process according to claim 1 wherein said separation of tellurium from selenium, copper and other impurities is carried out in at least two extraction stages, two scrubbing stages and two stripping stages.

7. A process according to claim 1 wherein said organic extractant for the separation of tellurium from selenium, lead, copper, and other impurities comprises from 5% to 100% by volume of tri-n-butyl phosphate balanced with kerosene.

8. A process according to claim 1 wherein said scrubbing solution for the separation of tellurium from selenium, lead, copper and other impurities is 3.5 M or greater hydrochloric acid.

9. A process according to claim 1 wherein said stripping solution for the separation of tellurium from selenium, lead, copper and other impurities is 1 M or less hydrochloric acid.

10. A process according to claim 1 wherein said scrubbing solution together with the selenium, lead, copper and other impurities-containing solution exit from the extraction stage where the organic extractant is introduced.

11. A process according to claim 1 wherein said aqua regia comprises nitric acid and hydrochloric acid in a ratio of one part of nitric acid to one part of hydrochloric acid to one part of nitric acid and ten parts of hydrochloric acid.

12. A process according to claim 1 wherein said separation of gold from arsenic, antimony, tin, silica, platinoids and other impurities occurs in at least one extraction stage and two scrubbing stages.

13. A process according to claim 1 wherein said scrubbing solution for the gold extraction is 3 M hydrochloric acid.

14. A process according to claim 1 wherein said scrubbing solution together with the extraction raffinate in the gold extraction step exit from the extraction stage where the organic extractant is introduced.

15. A process according to claim 1 wherein said organic extractant for the separation of gold from arsenic, antimony, tin, silica, platinoids and other impurities is diethylene glycol dibutyl ether.

16. A process according to claim 1 wherein said temperature for the separation of gold from arsenic, antimony, tin, silica, platinoids and other impurities is between about 15° to 20° C.

17. A process according to claim 1 wherein said recovery of gold from the gold-loaded organic extractant is carried out between about 70° to 80° C.

* * * * *